March 3, 1959 P. C. ROBINSON 2,875,673
APPARATUS FOR HEAT SEALING A PLY OF A BAG TUBE
Filed April 17, 1956 4 Sheets-Sheet 1
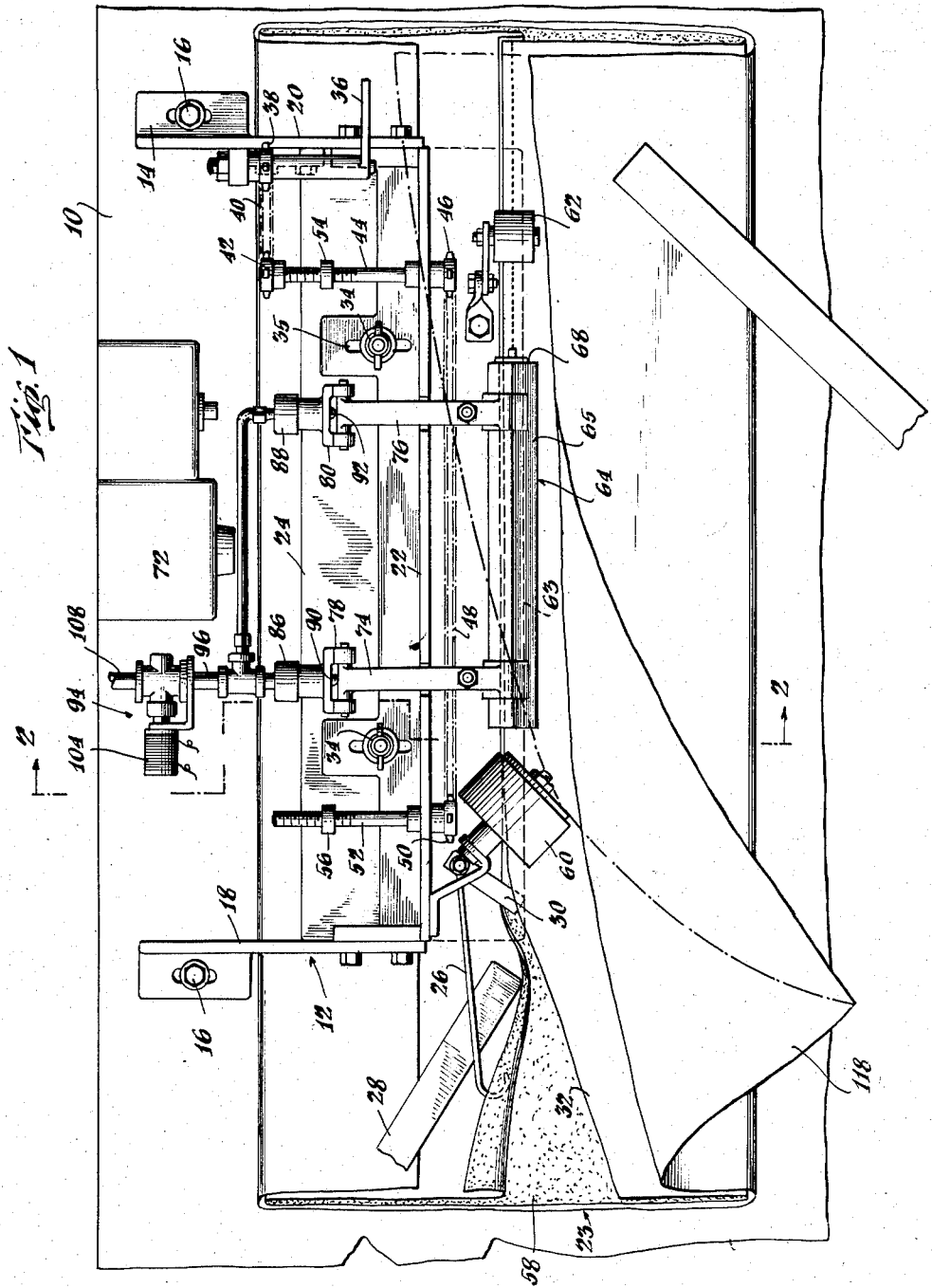
INVENTOR
Paul C. Robinson
BY
Eyre, Mann & Burrows
ATTORNEYS

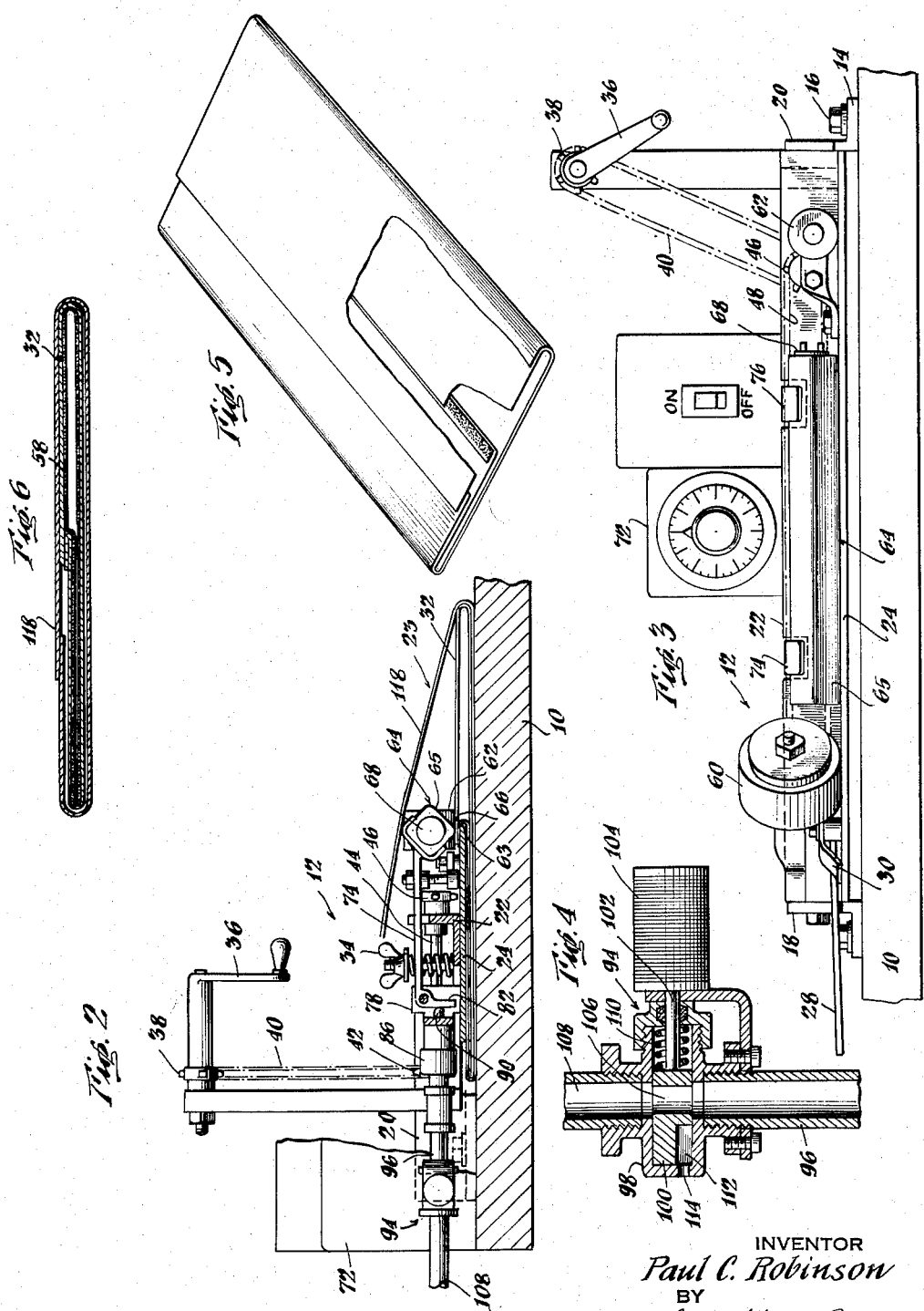

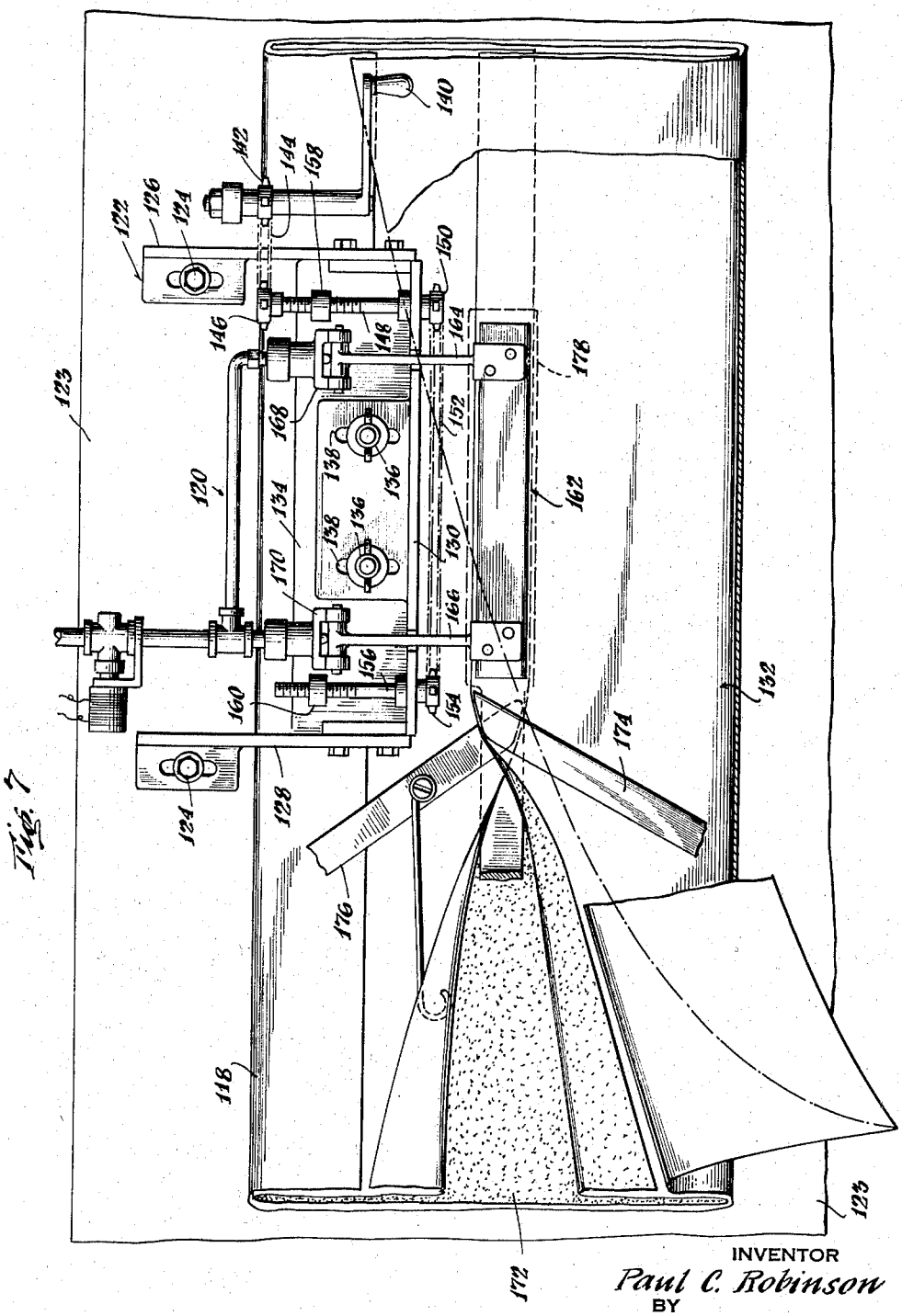

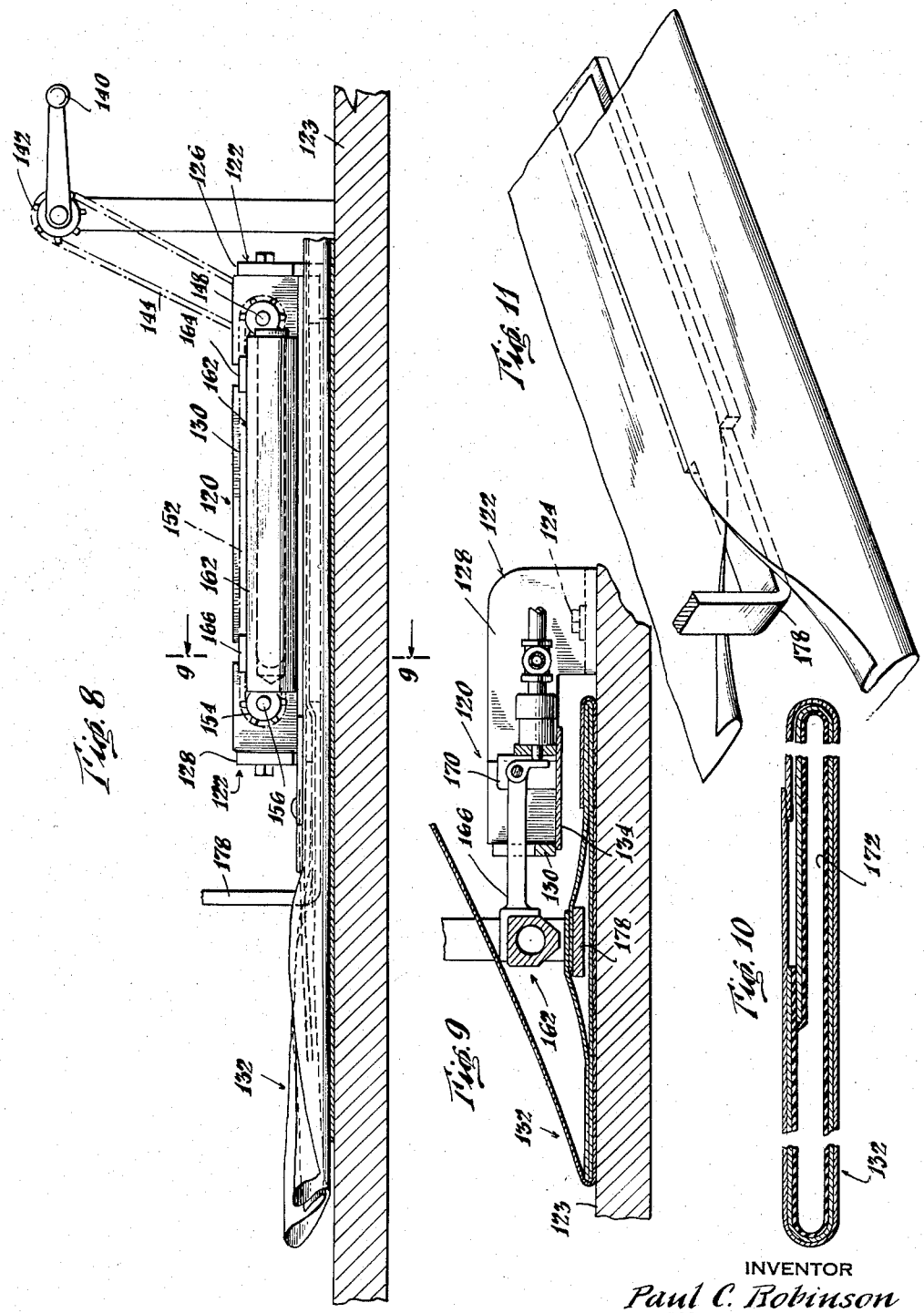

United States Patent Office 2,875,673
Patented Mar. 3, 1959

2,875,673

APPARATUS FOR HEAT SEALING A PLY OF A BAG TUBE

Paul C. Robinson, Canajoharie, N. Y., assignor to Arkell and Smiths, a corporation of New York Application April 17, 1956, Serial No. 578,781

8 Claims. (Cl. 93—20)

This invention relates to apparatus and method for forming a heat-sealed seam in the ply of a paper bag tube having a liner of heat-fusible material.

Paper bags with liners of heat-fusible material are now in demand where waterproof packages are needed, and I have found that the most effective package is achieved when the liner is sealed against itself in such a way as to form a continuous inner envelope of waterproof material. In accordance with my invention I seal the heat-fusible liner by means of heat alone which is of advantage in eliminating the adhesives ordinarily employed for this purpose. In the case of a multiwall bag the liner is heat-sealed before the bag tube is completely formed and to this end I provide apparatus that is mounted on the bed of a bag tube-forming machine in position where it fits into the gap between the outer plies of the partially formed bag tube so that the heat-fusible liner is sealed just before the outer plies are pasted together to form the finished tube. In the preferred form of my invention heat-sealing the liner is achieved by turning the paper over at one side of the ply to expose the heat-fusible material and then the liner at the second side of the ply is brought into overlapping relationship and held in face to face contact with the exposed portion of the liner while heat is applied to fuse and seal the liner and form a seam that gives a continuous inner envelope of heat fusible material.

My invention is best understood by reference to the accompanying drawings in which:

Fig. 1 is a top view of my heat sealing apparatus with the top plies of the bag tube turned back to better illustrate its construction;

Fig. 2 is taken on line 2—2 of Fig. 1;

Fig. 3 is a front view of the apparatus of Fig. 1;

Fig. 4 is an enlarged detailed sectional view of a solenoid air valve of Fig. 1;

Fig. 5 is an isometric view of a finished multiwall bag tube having a heat sealed seam made in accordance with my invention;

Fig. 6 is a sectional view of another form of multiwall bag tube having a heat sealed seam made in accordance with my invention;

Fig. 7 is a top view of a modified form of my heat sealing apparatus;

Fig. 8 is a front view of the apparatus of Fig. 7;

Fig. 9 is taken on line 9—9 of Fig. 8;

Fig. 10 is a sectional view of a bag tube seam made with the apparatus of Figs. 7 through 11; and Fig. 11 is an enlarged isometric view of the seam forming plate of Fig. 8.

Turning now to the drawings, 10 is a portion of the bed of an ordinary multiwall bag tube forming machine. Only a portion of the bed is shown in the drawings because these machines are well known articles of commerce and the tube forming machine is not of my invention. The tube forming machine operates in the usual way by folding over the sides of one or more plies of bag forming material so that side edge portions of each individual ply are brought into overlapping relationship. The overlapping portions are then ordinarily pasted together to form the finished tube. When the bag tube has more than one ply the plies are staggered so that the seam in each ply of the tube will be staggered as illustrated in Fig. 6. The bag tube forming machine illustrated in the drawings is adapted for forming a non-gussetted bag tube but it will be understood that my apparatus will function equally as well with a machine that forms gussetted bag tubes since this does not affect the way in which the plies are pasted together on the bed of the machine. The heat sealing apparatus of my invention is adapted for heat sealing a single ply bag tube or for heat sealing one of the plies in a multiwall bag tube. No adhesive is required on the ply to be heat sealed but such ply must be made of heat fusible material or it must carry a liner of heat fusible material or a strip of heat fusible material located in the line of the seam. The heat fusible material may be laminated or pasted to the ply in known manner and the heat fusible liner is preferably coextensive with the ply of bag forming material. For best results the liner of heat fusible material is made of a waterproof thermoplastic material which when sealed gives a continuous inner envelope of waterproof material.

12 is the preferred form of heat sealing apparatus of my invention which includes a three-sided rectangular framework 14 mounted on bed 10 by means of bolts 16. The framework has two side arms 18 and 20 respectively and a cross member 22 and the side arms are long enough so that mounting bolts 16 may be positioned outside the line of travel of the partially formed bag tube 23. Mounted under framework 14 is a seam forming plate 24 which cooperates with a wire guide member 26 and forming shoes 28 and 30 respectively to turn and fold the paper over along one side of the inner ply 32 of multiwall bag tube 22. Plate 24 is slidably mounted under framework 14 by means of spring tensioned bolts 34 which fit in slots 15 in the forming plate so that the plate may be moved transversely across the bed of the forming machine to adjust for changes in size or position of inner ply 32. When necessary, the position of plate 24 is changed relative to the bed of the forming machine so that a uniform fold along the side of the inner ply will be maintained. The position of seam forming plate 24 relative to bed 10 may be changed by turning crank arm 36 which is connected by means of gear 38 and chain 40 to a gear 42 carried on shaft 44 (see Figs. 1 and 4). Shaft 44 is rotatively mounted in cross member 22 at one end of framework 12 and it is connected by means of gear 46 and chain 48 to a gear 50 mounted on a second shaft 52 which is in turn rotatively mounted in cross member 22 at the other end of framework 12. Each of the shafts 44 and 52 are in threaded engagement with upright members 54 and 56 respectively, which members are mounted in a stationary position on seam forming plate 24. With this construction when crank 36 is turned, shafts 42 and 52 also turn, and since the shafts are in threaded engagement with uprights 54 and 56 the uprights are forced to move along the shafts and carry seam forming plate 24 with them.

As shown in the drawing the inner ply 32 of tube 22 carries a coating of heat fusible material 58 (see Fig. 6) which may be a fluid proof thermoplastic material such as polyethylene or sheet of Pliofilm laminated to the ply. Alternatively the heat fusible material may be in the form of a separate sheet pasted to inner ply 32. As previously described, heat fusible material 58 is exposed by turning inner ply 32 over on itself along one side of the ply. The heat fusible material at the second side of the ply is then brought over and held in face to face contact with the exposed portion of heat fusible material by means of idler rollers 60 and 62 which are pivotally mounted on opposite ends of framework 12 so that the weight of the rollers bears against the paper. Roller 60 is so positioned that its line of travel is at an angle of about 45° with the side edge 63 of seam forming plate 24 and by positioning this roller at such an angle it helps in keeping the fold of the inner ply pressed tightly against the edge of seam forming plate 24. The line of travel of roller 62 is parallel to the line of side edge 63 of seam forming plate 24.

Heat required for fusing liner 58 is supplied by means of a heater 64 which includes a casing 65 with a flat bottom surface 66 about 12 inches long that slides along the double thickness of inner ply 32 on top of seam forming plate 24 to apply heat in a line as distinguished from the spot application given by a roller. Casing 65 is hollow and it carries an ordinary cylindrical cartridge type electric resistance heating element 68 which is connected by means of wires (not shown) to a heat control unit as for example rheostat 72 which controls the flow of electricity and temperature of heater 64. The heat required for fusing the thermoplastic liner is determined by the physical characteristics of the selected thermoplastic material, the speed of travel of the ply, its thickness and length of heater in contact with the ply. Of course physical characteristics of the ply and its speed of travel may be changed and it may then be necessary to change the length of the heater in contact with the ply and its temperature for the particular thermoplastic material involved. In general the heater should be at least 6 inches in length and it may be as long as 24 inches or more in length. Preferably the heater should be capable of reaching a temperature of at least 400° F.

Heater 64 is carried by a pair of arms 74 and 76 which are each pivotally mounted in an upright member 78 and 80 respectively and the uprights are in turn mounted in a set position on seam forming plate 24 so that heater 64 will move with plate 24 and remain in a set position relative to the side edge of the plate. It sometimes happens that tube 22 is stopped in the bag tube forming machine and in such case heater 64 would burn through the ply of the tube. I solve this problem by providing each of heater support arms 74 and 76 with a lug 82 which projects down below the pivotal point of the arms in members 78 and 80. Adjacent each lug are air cylinders 86 and 88 which carry pistons 90 and 92 respectively and the air cylinders are so located that when air pressure is supplied to the cylinders pistons 90 and 92 move to the right which force arms 74 and 76 to rotate counterclockwise and lift heater 64 up away from the paper. When air pressure in cylinders 86 and 88 is released the heater drops back down against the paper of its own accord forcing the piston back into the cylinder. Air pressure to cylinders 86 and 88 is controlled by means of a suitable control valve as for example solenoid valve 94 which is connected to pipe 96 which supplies air to the cylinders shown in Figs. 1 and 4. Referring to Fig. 4, solenoid valve 94 includes a chamber 98 having a slide 100 therein which carries a shaft 102 that projects into electromagnet 104.

Slide 100 has an opening 106 arranged to allow air supplied by pipe 108 from a suitable pressure source (not shown) to flow through the valve and into pipe 96. With the slide of valve 94 in this position, air is supplied to cylinders 86 and 88 and heater 54 is held above and out of contact with inner ply 32. In order to bring heater 64 in contact with inner ply 32 electricity is supplied to electromagnet 104 and as a result slide 100 is pulled over to the right (Fig. 4) against the tension of spring 110 and the opening 112 is then aligned with the opening of pipe 96 so that air pressure on cylinders 86 and 88 is by-passed through the valve to the atmosphere through opening 114 in chamber 98 of valve 94. The opening in pipe 108 is closed by the solid portion of slide 100. When the flow of electricity to electromagnet 104 is interrupted the tension of spring 110 drives slide 100 to the left and into the position shown in Fig. 4. Electromagnet 104 is connected to the power drive of the bag forming machine by suitable electrical means (not shown) which are adapted to supply electricity to electromagnet 104 when the bag forming machine is in operation and cut off the supply of electricity to the electromagnet when the machine is stopped.

Referring to Fig. 3 it will be seen that my apparatus has little height and with the exception of roller 60 it is not over about 3 or 4 inches high. As a result my heat sealing apparatus readily fits into the gap between the outer plies of the bag tube so that the inner ply may be overlapped and sealed just before the outer plies are pasted together. As shown in the dot and dash lines of Fig. 1 and in Fig. 2 the outer plies of the bag tube may be fed right over my heat sealing apparatus into position for pasting. As a result my apparatus may be installed in existing bag tube forming machines without making any mechanical changes in the existing machine. In operation the inner ply of paper is threaded through my apparatus as best shown in Fig. 1 and once the paper is in position operation is automatic. With my device the seam is formed by means of heat alone and as best shown in the finished bag tube illustrated in Fig. 6, the heat fusible liner 58 forms a continuous envelope of waterproof material. The bag tube shown in Fig. 6 has a single outer ply 118 but it will be understood that the tube may have a plurality of outer plies. It is obvious that the heat fusible liner need not be coextensive with the ply of bag forming material and if desired a single strip of heat fusible material may be applied along the line of the seam as shown in Fig. 5. In such case the heat fusible material will fuse and adhere directly to the material of the ply to form the seam. My device may also be used for heat sealing a single ply made entirely of heat fusible material should it be desirable to make single ply containers of such material. My device is of particular advantage in heat sealing a ply of paper which is provided with a liner of heat fusible material because with my device heat is applied along a line and this enables the heat to penetrate through the paper so that the heat fusible liner will melt and fuse together. In all cases the heat sealed seam formed by my preferred form of apparatus shown in Figs. 1 through 6 is a so called fin type seam where one side of a ply is folded back over upon itself and then the second side of the ply is brought into overlapping relationship and sealed against the top layer of the fold as illustrated in the drawings.

In Figs. 7 through 11 I illustrate a modified form of my heat sealing apparatus especially adapted for forming a simple overlap seam of the type shown in Fig. 10. The heat sealing apparatus 120 shown in Figs. 7 through 11 is substantially the same as the preferred form of my apparatus illustrated in Figs. 1 through 6 and it includes a three sided rectangle framework 122 mounted on bed 123 of an ordinary multiwall bag tube forming machine by means of bolts 124. The framework has two side arms 126 and 128 and a cross member 130 and the side arms are long enough so that mounting bolts 124 may be positioned outside the line of travel of the partly formed bag tube 132. A plate 134 (see Fig. 9) is slidably mounted under frame work 122 by means of spring tensioned bolts 136 which are mounted in slots 138 in plate 134 so that the plate may be moved in relation to framework 122. The position of plate 134 is changed relative to framework 122 by turning crank arm 140 which is connected by means of gear 142 and chain 144 to a gear 146 mounted on shaft 148 (see Figs. 7 and 8). Shaft 148 is rotatively mounted in cross member 130 at one end of framework 122 and it is connected by means of gear 150 and chain 152 to a gear 154 mounted on a second shaft 156 which is in turn rotatively mounted in cross member 130 at the other end of framework 122. Each of the shafts 148 and 156 are in threaded engagement with upright members 158 and 160 respectively, which members are mounted in a stationary position on plate 134. With this construction when crank 140 is turned shafts 148 and 156 also turn and since the shafts are in threaded engagement with uprights 158 and 160 the uprights are forced to move along the shafts and carry plate 134 with them.

Heat required for forming the seam is supplied by means of a heater 162 which is exactly the same as heater 64 described in connection with the preferred form of my invention shown in Figs. 1 through 6. Heater 162 is carried by a pair of arms 164 and 166 which are each pivotally mounted in upright members 168 and 170 respectively and the uprights are in turn mounted in a set position on plate 134 so that heater 162 will move with plate 134 when the position of the plate is changed relative to framework 122. From time to time it may prove necessary to adjust the position of heater 162 in order to maintain it in proper position relative to bag tube 132 in which the heat sealed seam is to be formed. Heater 162 is automatically raised and lowered in the same manner by means of the same apparatus described in connection with heater 64 in the preferred form of my invention shown in Figs. 1 through 6.

Referring now to Fig. 10 it will be seen that the heat sealed seam to be formed in the inner ply of bag tube 132 is in the form of a simple overlap seam formed by bringing portions of the opposite sides of the inner ply of the tube into overlapping relationship. As illustrated in Fig. 7 opposite side portions of the inner ply are first brought into overlapping relationship and heat sealed and then subsequently the outer plies of the bag are brought into overlapping relationship and sealed by means of an ordinary adhesive. The inner ply of the bag tube shown in Fig. 10 is made of a suitable bag forming material which carries an inner liner of thermoplastic material 172 laminated thereto. If desired a strip of thermoplastic material (not shown) may be applied to the outside surface at one side of the inner ply in order to bring thermoplastic material into face to face contact. In the form of my invention shown in Figs. 7 through 11 the inner ply is brought into overlapping relationship by means of shoes 174 and 176 which are employed in a standard tube forming machine in a manner well known in the art.

Referring now to Fig. 7 it will be seen that the overlapping portions of the inner ply of the bag tube are positioned on top of a seam forming plate 178 which may be supported by any convenient means (not shown) in position on top of the bed of the bag tube forming machine under heater 162. In order to heat seal the thermoplastic material of the inner ply, heater 162 is pressed down against the exposed surface of the inner ply above seam forming plate 178 and heat is applied to the overlapped portions of the ply to form a seam in the same manner as described for the preferred form of my invention.

As in the preferred form of my invention no adhesive is required on the ply that is to be heat sealed but such ply must be made of heat fusible material or it must carry a liner of heat fusible material or a strip of heat fusible material located in the line of the seam. The apparatus illustrated in Figs. 7 through 11 has little height and it is not over about 3 or 4 inches high. It readily fits into the gap between the outer plies of the bag tube so that the inner ply may be overlapped and sealed just before the outer plies are pasted together in ordinary bag tube forming machines as illustrated in the drawings.

It will be understood that I intend to cover all changes and modifications of the preferred embodiment of my invention herein chosen for the purpose of illustration which do not constitute departures from the spirit and scope of my invention.

What I claim is:

1. Apparatus for forming heat-sealed seam in the inner ply of a multiwall bag tube having a liner of heat-fusible material comprising a seam-forming plate, a fixed support member, means for slidably mounting said plate on said fixed support member, forming means mounted in fixed position adapted to cooperate with such plate to turn the inner ply over along one side and expose the heat-fusible liner, feeding means adapted to feed the second side of the inner ply into overlapping relationship with the exposed portion of the heat-fusible liner to bring and hold portions of the heat-fusible liner at opposite sides of the inner ply in face-to-face contact, electric heating means mounted on said seam forming plate which heating means are adapted to bear against the overlapped portions of the inner ply on top of the seam-forming plate and apply heat in a line to cause the overlapped portions of the liner to fuse and form a continuous inner envelope of heat-fusible material, said apparatus being further adapted to be mounted on the bed of a multiwall bag tube-forming machine by means of the fixed support member in position where the heat sealing means and forming plate will project into the gap left between the outer plies of the tube just before the outer plies are pasted together to form the finished tube and means associated with said seam-forming plate and fixed support member adapted to slide the seam forming plate and electric heating means across the bed of the bag tube forming machine while the machine is in operation to move the seam forming plate and electric heating means into position to bear against the overlapped portion of the said liner and form a seam in the liner.

2. A structure as specified in claim 1 in which the feeding means include an idler feed roller rotatively mounted in a fixed position with its line of travel at an angle of about 45° with a side edge of the forming plate to assist in holding one side of the ply against the side edge of the forming plate.

3. A structure as specified in claim 1 in which the electric heating means includes a casing having a flat surface portion that extends throughout its length for applying heat in a line to the seam and means adapted to lift the casing away from the ply when movement of the ply through the bag tube forming machine is stopped, said means including a pivotal arm for mounting the casing and an air cylinder with an electric solenoid control valve which cooperate with and actuate the pivotal arm for lifting the casing up away from the ply and electrical means connecting the solenoid with the power supply of the bag tube forming machine, said electrical means being adapted to actuate the solenoid when the electrical power to the machine is interrupted.

4. A structure as specified in claim 1 which includes means for feeding one of the outer plies of the bag tube over on top of at least a portion of said electric heating means.

5. An apparatus for forming heat-sealed seam in the ply of a bag tube having a liner of heat-fusible material said apparatus being adapted to be mounted in the bed of ordinary bag tube forming machine comprising a seam-forming plate a fixed support member, means for slidably mounting said plate on said fixed support member, forming means mounted in fixed position and adapted to co-operate with such plate to turn the ply over on one side and expose the heat-fusible liner, feeding means adapted to feed the second side of the ply into overlapping relationship with the exposed portion of the heat-fusible liner to bring and hold portions of heat-fusible material at opposite sides of the ply in face-to-face contact, electric heating means mounted on said seam forming plate which heating means are adapted to cooperate with the seam-forming plate and bear against the overlapped portions of the ply to apply heat in a line and thereby cause the overlapped portions of the liner to fuse and form a continuous inner envelope of heat-fusible material and means associated with said seam forming plate and fixed support member adapted to slide the seam forming plate and electric heating means across the bag tube while said tube is being formed to move the seam forming plate and electric heating means into position to bear against the overlapped portions of said liner and form the seam.

6. Apparatus for forming heat-sealed seam in a ply of heat-fusible material said apparatus being adapted to be mounted on the bed of an ordinary bag tube forming machine comprising a seam-forming plate a fixed support member, means for slidably mounting said plate on said fixed support member, forming means mounted in fixed position and adapted to cooperate with such plate to turn the ply over along one side thereof, feeding means adapted to feed the second side of the ply into overlapping relationship and hold the overlapped portions of the ply in face-to-face contact, electric heating means mounted on said seam forming plate which heating means are adapted to cooperate with the seam-forming plate and bear against the overlapped portions of the ply to apply heat in a line thereto, causing the overlapped portions of the ply to fuse and form a continuous envelope of heat-fusible material and means associated with said seam forming plate and fixed support member adapted to slide the seam forming plate and electric heating means across the bag tube while said tube is being formed to move the seam forming plate, and electric heating means into position to bear against the overlapped portions of said liner and form the seam.

7. Apparatus for forming heat-sealed seam in a ply of a bag tube having a strip of heat-fusible material positioned adjacent one side thereof said apparatus being adapted to be mounted on the bed of an ordinary bag tube forming machine comprising a seam-forming plate a fixed support member, means for slidably mounting said plate on said fixed support member, forming means mounted in fixed position and adapted to cooperate with such plate to turn the paper over along one side of the ply and expose the strip of heat-fusible material, feeding means adapted to feed the second side of the paper ply into overlapping relationship with the exposed strip of heat-fusible material and to hold the overlapping portions of the ply in face-to-face contact, electric heating means mounted on said seam forming plate which heating means are adapted to cooperate with the seam-forming plate for applying heat in a line to the overlapped portions of the ply and thereby cause the strip of heat-fusible material to adhere to the paper at the second side of the sheet and form a seam in the bag tube and means associated with said seam forming plate and fixed support member adapted to slide the seam forming plate and electric heating means across the bag tube while said tube is being formed to move the seam forming plate and electric heating means into position to bear against the overlapped portions of said liner and form the seam.

8. Apparatus for forming a heat-sealed seam in a ply of a multiwall bag tube having heat sealable material positioned adjacent each of the two opposite side edge portions of said ply, said apparatus being adapted to be mounted on the bed of an ordinary bag tube forming machine comprising a fixed support member, a support plate slidably mounted by said fixed support member, a seam forming plate, means for mounting said seam forming plate in fixed position, forming means adapted to cooperate with said seam forming plate to feed opposite side edges of said ply into overlapping relationship against said seam forming plate with the heat sealable material of each of said opposite side edges in face to face contact, electric heating means mounted in fixed position on said support plate which heating means are adapted to cooperate with the seam forming plate and bear against the overlapped portion of heat sealable material to apply heat in a line and thereby cause the overlapped portions of the heat sealable material to fuse and form a seam and means associated with said support plate and fixed support member adapted to slide the support plate and electric heating means across the bag tube while said tube is being formed to move the electric heating means into position to bear against the overlapped portions of heat sealable material to form the seam.

References Cited in the file of this patent

UNITED STATES PATENTS

| | | |
|---|---|---|
| 2,114,625 | Bergstein | Apr. 19, 1938 |
| 2,176,370 | Wagner | Oct. 17, 1939 |
| 2,220,874 | Waters | Nov. 5, 1940 |
| 2,298,522 | Waters | Oct. 13, 1942 |
| 2,660,219 | Haas et al. | Nov. 24, 1953 |